United States Patent [19]

Shames et al.

[11] 3,872,476

[45] Mar. 18, 1975

[54] FRUIT REDUCTION BY PROBE SELECTION

[75] Inventors: Oscar Shames, Cherry Hill, N.J.;
James L. Hinds, Telford, Pa.;
Michael G. Raditz, Furlong, Pa.;
Gerald J. Palatucci, Warminster, Pa.

[73] Assignee: The United States of America as represented by the Secretary of the Navy, Washington, D.C.

[22] Filed: Nov. 23, 1973

[21] Appl. No.: 418,694

[52] U.S. Cl. ................. 343/6.5 LC, 343/6.8 LC
[51] Int. Cl. ........................................ G01s 9/56
[58] Field of Search ......... 343/6.5 R, 6.5 LC, 6.8 R, 343/6.8 LC

[56] References Cited
UNITED STATES PATENTS

| | | | |
|---|---|---|---|
| 3,302,197 | 1/1967 | Humpherys | 343/6.5 LC |
| 3,611,379 | 10/1971 | Deckett | 343/6.5 LC X |
| 3,715,750 | 2/1973 | Bishop | 343/6.8 LC |
| 3,803,602 | 4/1974 | Case et al. | 343/6.5 LC |

Primary Examiner—Malcolm F. Hubler
Attorney, Agent, or Firm—R. S. Sciascia; Henry Hansen

[57] ABSTRACT

In an interrogator-transponder collision avoidance system a probe selector detects the presence of two distinct signals, P or Q. Detection of a P signal at the input dictates a Q output and vice versa. Additional circuitry resolves ambiguity when P and Q appear concomitantly. In the absence of either P or Q at the input, the output is randomly chosen to be either P or Q.

5 Claims, 5 Drawing Figures

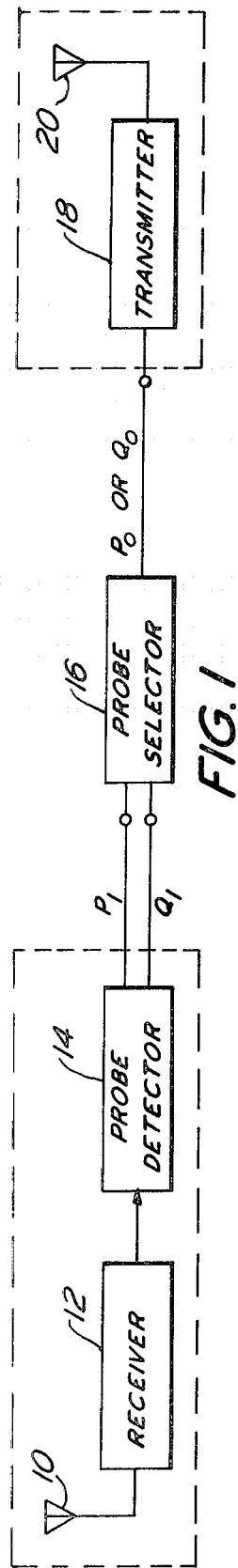
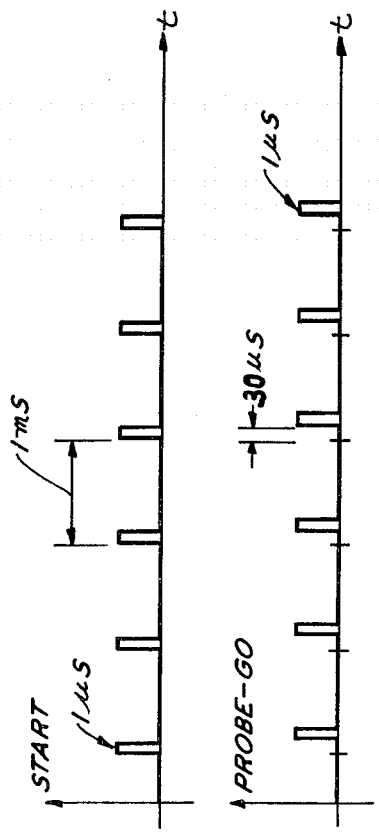
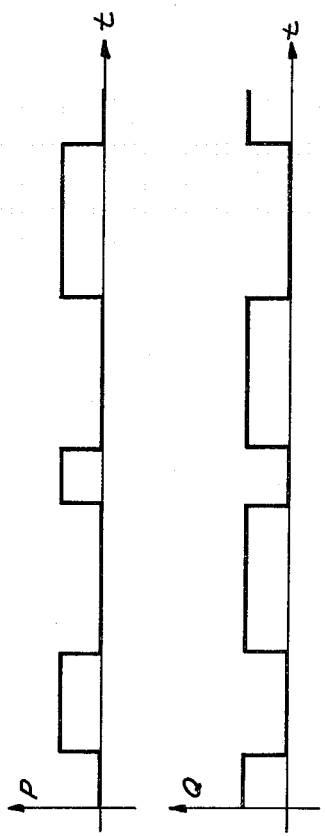

FRUIT REDUCTION BY PROBE SELECTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Collision avoidance systems employing interrogator-transponder (prober-remitter) techniques have been proposed as a means of preventing midair collisions. In such systems traffic handling capability is usually limited by reception of replies to interrogations other than ones own interrogations. These extraneous replies are called fruit. The general purpose of this invention is to reduce the amount of fruit in the probing aircraft's range of interest. Other than the range of interest, the fruit received by the probing aircraft is of no interest. By reducing the fruit in the range of interest to each prober, traffic handling capability is increased beyond that which would otherwise be possible.

An existing collision avoidance system, known by the acronym SECANT (SEparation Control of Aircraft by Nonsynchronous Techniques), employs multiple frequencies for probes and replies and uses special correlator techniques as a means of coping with the fruit problem generated by aircraft in high traffic areas. A simplified description of that portion of SECANT which is germane to the present invention follows.

Each aircraft probes its surrounding environment on either of two randomly selected frequencies $P_0$ or $Q_0$. The prober then listens for replies. Aircraft within range of the prober reply on one of four frequencies $P_1^-$, $P_1^+$, or $Q_1^-$, or $Q_1^+$. The P-type reply is sent in answer to a P-type probe. The Q-type reply is sent in answer to a Q-type probe. The choice of the superscript (− or +) depends on the data the replying aircraft is sending to all probers during successive one millisecond intervals of time. For example, (−) for a 0 and (+) for a 1 in binary form. (However, for purposes of this invention the P− and the P+ signals are treated simply as $P_1$ signals and the Q− and Q+ signals are treated simply as $Q_1$ signals).

After detecting and decoding the data impressed upon the received replies, a prober can measure range to its targets, range rate from successive ranges, and data including barometric altitude.

In general half of the received fruit will be P type and half will be Q type. Correlation in 500 foot range bins results in the annihilation of P type fruit by Q type fruit, leaving the targets exposed. Once a target is detected a tracking gate is assigned to measure the range and range rate. At the same time the binary bit of the reply pulse being tracked is recorded. Finally, a threat determination is made based on (Range/Range Rate) = TAU, where TAU is the time to a collision if the aircraft are on a collision course. Since each prober compares target altitude with its own altitude, an up or down escape maneuver can be indicated to the pilot.

The correlator technique used in SECANT is a powerful fruit reducer for the purpose of detecting a target. Having once detected a target and initiated a range rate and data track, the range correlator plays no further part. Now any fruit occurring in the 1μs wide tracking gate can effect the range rate and the data. Since fruit replies vary as $(n)(n-1)$ where n is the number of aircraft other than the prober, the problem of tracking and reading data becomes a serious one in dense traffic.

SUMMARY OF THE INVENTION

For a proper understanding of this invention it is important to recognize that although fruit appears to be a random mixture of P-type and Q-type it really comes in clusters of about 100 μs following each received probe and has the same character as the probe. Thus, receipt of a P-probe from aircraft B by aircraft A can be used as a predictor to A that he is about to receive a cluster of P-type fruit. The fruit consists of the (n−1) P-type replies to the P-probe. If A does not interrogate within 100 μs of receipt of B's probe he need not be concerned with this fruit since it does not occur during the 90 μs following A's interrogation. Thus if it is possible for A to find a "quiet spot" in which to interrogate he will see little or no fruit following his interrogation. Some of the aircraft will be probing at a regular rate (when they are tracking) and some will be probing at a time jittered rate (when they are correlating in the process of searching for a target) and some will always be probing at a lower repetition rate which is also time jittered.

Because the fruit appears in clusters it is possible for A to find a "quiet spot" with respect to the regular rate (no probe jitter) probers, but not with respect to the jittered probers. Once A has picked a "quiet spot" in which to probe he need worry only about fruit from the random probers. The "quiet spot" selection technique is itself a fruit reducer for aircraft A in the 90 μs time interval following his interrogation. That is while there may be a high fruit rate when averaged over a one second interval, there could be a low fruit rate in the 100 μs interval of interest to A particularly in the 1 μs interval of his data tracking gate.

Having pointed out the possibility of selecting a "quiet spot" with respect to the regular probers, this invention then proceeds to remove much of the remaining fruit generated by the random probers. The basic idea is centered on a modification of the normally random selection of P or Q probe outputs. Each time a probe is received by aircraft A at a time before his own probe of, for example, 50 μs or less, A modifies his random selection to always choose the opposite type probe. If he receives a P-type probe he probes with a Q and vice versa. This simple technique eliminates all of the fruit associated with the preceding probe since it is only fruit of the same type as A's probe that is troublesome.

Further features and advantages of the invention will become more readily apparent from the following detailed description when taken in conjunction with the accompanying drawings.

BRIEF DESCRIPTION OF THE DRAWINGS

FIG. 1 is a much simplified block diagram indicating how a probe selector according to the invention cooperates with other system components;

FIG. 3a, FIG. 3b and FIG. 3c show waveforms of several basic signals used within the probe selector of FIG. 1.

DESCRIPTION OF THE PREFERRED EMBODIMENT

Figure 2:
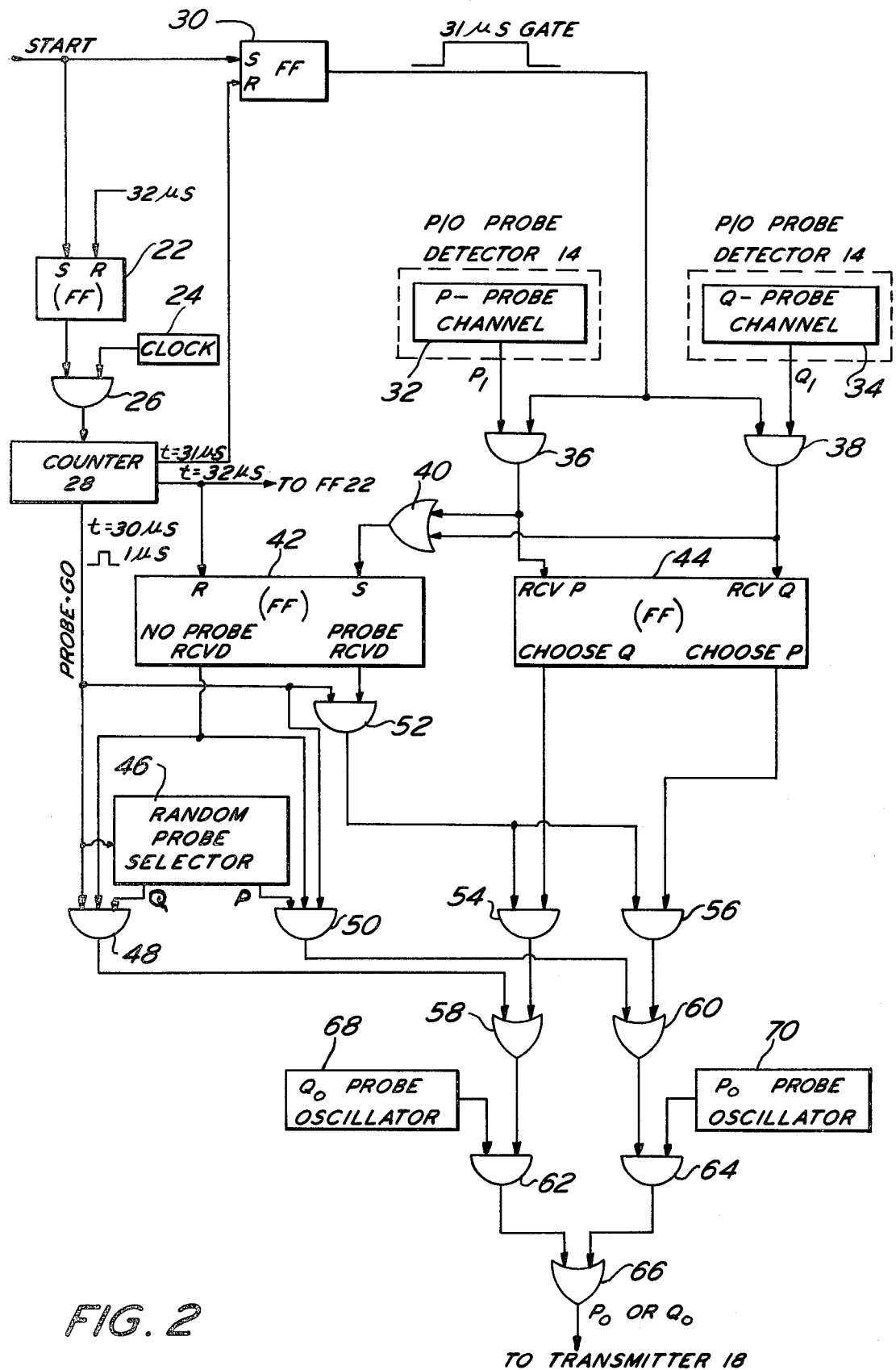
FIG. 2 is a logic diagram of the probe selector of FIG. 1.

FIG. 1 is an overall block diagram indicating how the probe selector of the present invention cooperates with an existing collision avoidance system. Through the cooperation of an antenna 10, a receiver 12, and a probe detector 14, a receiving aircraft detects the probes of other aircraft. These probes are signals on one of two frequencies which are decoded by the receiver 12 and the probe detector 14 to produce a 1 $\mu$s pulse at the output of probe detector 14. The signal $P_1$ is present if a P type probe is decoded; the signal $Q_1$ is present if a Q type probe is decoded. These signals are then injected into a probe selector 16 which insures that a $P_0$ signal is transmitted to other aircraft if the receiving aircraft has decoded a Q-type probe. Conversely, the probe selector 16 insures that a $Q_0$ signal is transmitted to other aircraft if the receiving aircraft has decoded a P-type probe. In the absence of either a P-type probe or a Q-type probe being received a predetermined time before the time at which the sending aircraft desires to transmit its own probe, then the P-type or Q-type probe is randomly selected by probe selector 16. The signal output of the probe selector 16 is sent via transmitter 18 and antenna 20 to surrounding aircraft. The dotted lines around the antennae, receiver, probe detector, and transmitter in FIG. 1 serve to highlight that these elements form no part of the present invention.

FIG. 2 assumes that an aircraft is probing its surrounding with either P-type or Q-type probes at 1,000 times per second with a 1 $\mu$s wide pulse when the aircraft is in the data mode of operation. P or Q type probes are detected in the appropriate probe detector frequency channel at the output of the receiver 12 and probe detector 14. If a P-type probe is sensed, probe detector 14 produces a 1 $\mu$s wide $P_1$ signal which is used as one input to AND gate 36. Alternatively if a Q-type probe is sensed, probe detector 14 produces a 1 $\mu$s wide $Q_1$ signal which is used as one input to AND gate 38.

The START signal is derived from the SECANT system timing assembly (not shown) and, in the data track mode, is a 1 $\mu$s pulse occurring every millisecond. The START signal normally represents the time at which an interrogating aircraft desires to send a probe. However, consistent with the objectives of this invention, the START signal is employed herein to control the probe selection scheme in the manner previously set forth above.

The START signal sets flip-flop 30 and enables counter 28 by setting flip-flop 22 which in turn opens AND gate 26 which permits timing pulses from clock 24 to enter counter 28. Counter 28 is arranged to count an interval of at least 32 $\mu$s with outputs brought out at the 30 $\mu$s, 31 $\mu$s and 32 $\mu$s counting intervals. The counting intervals chosen are typical and could be optimized either higher or lower.

Setting flip-flop 30 will gate open the P-probe channel 32 and the Q-probe channel 34 for 31 $\mu$s via AND gates 36 and 38. If there is an output from the P-probe channel, flip-flop 44 will be reset and a $Q_0$ probe is chosen. The output from the P-probe channel also sets flip-flop 42 via OR gate 40. The state of flip-flop 42 now indicates that an incoming probe has been received. At the end of 30 $\mu$s, counter 28 puts out a 1 $\mu$s probe-go pulse. This pulse and the probe received output of flip-flop 42 via AND gate 52 enables the "Choose-Q" output of flip-flop 44 to pass through AND gate 54. The 1 $\mu$s pulse from AND gate 54 via OR gate 58 is combined with the output of the $Q_0$ probe oscillator 68 in AND gate 62. The resultant output from AND gate 62 goes through OR gate 66 to the transmitter 18.

Similarly if there is an output from the Q-probe channel 34 during the 30 $\mu$s gate time, the $P_0$ probe oscillator 70 is gated to the transmitter 18 to initiate a $P_0$ probe. If several incoming probes appear during the 30 $\mu$s gate time, the last probe will determine the final state of flip-flop 44 when counter 28 puts out its probe-go pulse at 30 $\mu$s. Thus the outgoing probe will always be opposite in type to the last received incoming probe.

If no probe was received during the 30 $\mu$gate time then the state of flip-flop 42 will be in the no probe received or reset state. This is because flip-flop 42 was reset during the immediately preceding cycle by counter 28 and was not set via OR gate 40 during the present cycle. If the random probe selector 46 is in the Q state when counter 28 puts out a probe-go pulse and flip-flop 42 is in the no probe received state, then the output of AND gate 48 via OR gate 58 will enable the $Q_0$ probe oscillator 68 output to pass through AND gate 62 and OR gate 66 to transmitter 18. In a similar way a $P_0$ probe will be transmitted when random probe selector 46 is in the P state.

The probe-go pulse occurs 30 $\mu$s after START. Counter 28 also resets flip-flop 30 at 31 $\mu$s to gate off P-probe channel 32 and Q-probe channel 34. In addition counter 28 resets flip-flop 42 and flip-flop 22 at 32 $\mu$s.

The random probe selector 46 is part of the normal complement of equipment within SECANT and may be implemented as a conventional electronic coin flipper; it determines in a random manner which type of probe ($P_0$ or $Q_0$) is to be transmitted when the probe-go signal is present.

FIGS. 3a, 3b, and 3c illustrate several basic signals provided by random probe selector 46 and the SECANT timing assembly (not shown). The START signal of FIG. 3a corresponds to the START input shown in FIG. 2 and represents the moment at which the SECANT system ordinarily desires to send a probe. FIG. 3b represents the probe-go signal which corresponds to the START signal but delayed 30 $\mu$s through the effect of counter 28. FIG. 3c represents the P and Q outputs produced by the random probe selector. The P and Q outputs are mutually exclusive in the sense that one and only one type of probe can be transmitted at a selected moment. When the P output is Hi, the Q output is Lo and vice versa. When the P output is in the Hi (or logical one) state it indicates that a P-type probe is to be transmitted and vice versa.

From the foregoing it is apparent that fruit reduction is obtained by monitoring the probes emitted by other aircraft and choosing an outgoing probe opposite in type to the last received probe. An alternative scheme may be employed to achieve the same objective. Instead of monitoring the probes of other aircraft, the interrogating aircraft monitors the replies of the other aircraft. These extraneous replies constitute fruit to the interrogating aircraft since they are not replies to the interrogating aircraft's own probes. the extraneous replies are integrated for a short period of time prior to the time at which the interrogating aircraft desires to send its own probe. The results of the integration indicate which type of reply predominates. If the predominate type is P then the interrogating aircraft probes its surroundings with a $Q_0$-type probe and vice versa. Integration of the fruit is easily accomplished with an RC network of suitable time constant (such as 50 $\mu s$) attached to the bus which feeds the range bins of the SECANT Range Correlator. P-type fruit puts a positive charge or count in the range bins, while Q-type fruit puts a negative charge or count in the range bins. Hence an integrator can determine the dominant type of fruit and the integrator output signal can be employed in a probe control circuit to select an outgoing probe opposite in type to the predominant type fruit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A probe selector comprising:
   clock means for producing periodic signals;
   counter means responsive to a START signal for counting said periodic signals and for producing at least three counting interval signals $T_1$, $T_2$ and $T_3$;
   gate generator means responsive to said START signal and to said signal $T_2$ for producing a gate signal of predetermined duration;
   first means responsive to a P probe and to said gate signal for producing a signal $P_1$;
   second means responsive to a Q probe and to said gate signal for producing a signal $Q_1$;
   first memory means responsive to said $P_1$ signal or to said $Q_1$ signal for storing said signals and for generating a choose-Q signal when said $P_1$ signal is stored and for generating a choose-P signal when said $Q_1$ signal is stored;
   second memory means responsive to said $P_1$ signal or to said $Q_1$ signal for registering the occurrence of said $P_1$ signal or said $Q_1$ signal and for producing a probe-received signal upon such occurrence, said second memory means being also responsive to said counting interval signal $T_3$ and arranged to register the occurrence of said signal $T_3$ and to produce a NO-probe-received signal upon registration of said signal $T_3$;
   first gate means responsive to said probe received signal and to said signal $T_1$ for producing a signal X;
   second gate means responsive to said signal X and to said signal choose-Q for producing a signal Y;
   third gate means responsive to said signal X and to said signal choose-P for producing a signal Z;
   probe selector means for producing a signal Q' and a signal P' on a mutually exclusive and random basis;
   fourth gate means responsive to said Q', to said NO-probe-received signal, and to said signal $T_1$ for producing a signal A;
   fifth gate means responsive to said P', to said NO-probe-received signal, and to said signal $T_1$ for producing a signal B.

2. The combination according to claim 1 further including:
   a $P_0$ probe oscillator;
   a $Q_0$ probe oscillator;
   sixth gate means responsive to said signal Y or to said signal A and to the output of said $Q_0$ probe oscillator for producing a signal $Q_0$; and
   seventh gate means responsive to said signal Z or to said signal B and to the output of said $P_0$ probe oscillator for producing a signal $P_0$.

3. The combination according to claim 1 wherein said counter means includes:
   a digital counter;
   a flip-flop set by said START signal and reset by said signal $T_3$; and
   gate means responsive to the set output of said flip-flop for gating said periodic signal to said digital counter.

4. A probe selector comprising:
   counter means responsive to a start signal and a periodic signal for counting said periodic signal and for producing a first timing interval signal $T_1$, a second timing interval signal $T_2$, and a third timing interval signal $T_3$;
   gate generator means responsive to said START signal and to said signal $T_2$ for producing a gate signal of predetermined duration;
   first means responsive to a P probe and to said gate signal for producing a signal $P_1$;
   second means responsive to a Q probe and to said gate signal for producing a signal $Q_1$;
   probe memory means responsive to said signal $P_1$ and to said signal $Q_1$ for registering the occurrence of said signals and for producing a choose-Q signal when the signal $P_1$ is registered and for producing a choose-P signal when the signal $Q_1$ is registered;
   probe record means responsive to said signal $P_1$ or to said signal $Q_1$ for recording said signals and for producing a probe-received signal, said probe record means being further responsive to said signal $T_3$ for recording said signal $T_3$ and for producing a no-probe-received signal;
   probe selector means responsive to said signal $T_1$ for producing a signal Q' and a signal P' on a mutually exclusive and random basis;
   first gate means responsive to said probe-received signal and to said signal $T_1$ for producing a signal X;
   second gate means responsive to said signal X and to said signal choose-Q for producing a signal Y;
   third gate means responsive to said signal X and to said signal choose-P for producing a signal Z;
   fourth gate means responsive to said signal Q', to said no-probe-received signal, and to said signal $T_1$ for producing a signal A; and
   fifth gate means responsive to said signal P', to said no-probe-received signal, and to said signal $T_1$ for producing a signal B.

5. The combination according to claim 4 and further including:
   a $P_0$ probe oscillator;
   a $Q_0$ oscillator;
   sixth gate means responsive to said signal Y or to said signal A and to the output of said $Q_0$ probe oscillator for producing a signal $Q_0$; and
   seventh gate means responsive to said signal Z or to said signal B and to the output of said $P_0$ probe oscillator for producing a signal $P_0$.

* * * * *